Patented July 24, 1951

2,562,119

UNITED STATES PATENT OFFICE 2,562,119

CHLORINATED ETHYLENE POLYMER COATING COMPOSITIONS

Harry J. Haon, Wilmington, Del., assignor to E. I. du Pont de Nemours and Company, Wilmington, Del., a corporation of Delaware No Drawing. Application July 8, 1949, Serial No. 103,751

8 Claims. (Cl. 260—29.6)

This invention relates to coating compositions and, more particularly, to coating compositions containing chlorinated polymers of ethylene.

U. S. Patent No. 2,290,794 describes a method of preparing aqueous dispersions of ethylene polymers. U. S. Patent No. 2,183,556 and application Serial No. 88,693, filed April 20, 1949, by Robert S. Taylor, describe methods of chlorinating ethylene polymers, and U. S. Patent No. 2,212,786 describes a method of preparing chlorosulfonated ethylene polymers.

Films of chlorinated ethylene polymers may be prepared by applying aqueous dispersions of such polymers to suitable substrates and baking to form a continuous film. However, due to the waxy character of the polymers, such films do not possess a satisfactory degree of adhesion, according to paint, varnish, and enamel standards, when applied to relatively non-porous surfaces such as metal, glass, and ceramics. It has been found that preliminary treatments and surface transformations, such as "Bonderizing" and sand blasting, somewhat improve the adhesion of these polymer films, but the degree of adhesion is still not comparable to that of films of conventional organic coating compositions.

It is, therefore, a principal object of this invention to provide a liquid coating composition containing a chlorinated ethylene polymer which, when applied to a substrate and fused into a continuous film, possesses a degree of adhesion to substrates which is comparable to that of conventional organic films.

Another object is to provide a liquid coating composition containing a chlorinated ethylene polymer which possesses excellent adhesion to substrates and which is suitable for use as a base or primer coat for a succeeding coat or coats of other ethylene polymer-containing compositions and/or other organic coatings.

Other objects will become apparent as the description proceeds.

These objects are accomplished by incorporating chromic acid in an aqueous dispersion of a chlorinated ethylene polymer.

The term "chromic acid" as used herein, is intended to include chromic anhydride (chromium trioxide $CrO_3$) and the hypothetical substance $H_2CrO_4$, and references to quantities of chromic acid are expressed in terms of the equivalent anhydride ($CrO_3$).

The term "chlorinated ethylene polymer," as used herein, is intended to include polymers of ethylene in which some of the hydrogen atoms are replaced by chlorine atoms, regardless of other substitutions, such as chlorinated ethylene polymers, chlorosulfonated ethylene polymers, and chlorofluoronated ethylene polymers.

The following examples illustrate embodiments of this invention and are given by way of illustration only, the parts being by weight:

Example 1

| | Parts |
|---|---|
| Finely divided chlorinated ethylene polymer | 220 |
| Oleic acid | 20 |
| Triethanolamine | 10 |
| Potassium hydroxide solution (5% in water) | 84 |
| Chromic acid | 95 |
| Water | 400 |

The chloro-ethylene polymer is prepared by the method described in U. S. Patent No. 2,183,556. It may also be prepared by the method described in copending application Serial No. 88,693, filed April 20, 1949, by Robert S. Taylor.

The chlorinated ethylene polymer is placed in a Banbury Mill with steam passing through the jacket and rotors to keep the contents of the mill at approximately 203° F. and milled for 20 minutes until it is thoroughly plastic and resembles a very stiff taffy. The oleic acid is then added in 4-part portions alternated with 2-part portion additions of triethanolamine. These additions are made over a period of 20 minutes, after which the mass is milled for another 30 minutes to insure thorough incorporation. The potassium hydroxide is then added in 12-part portions over a period of 40 minutes. At the end of this time, the steam heat is cut off and the milling continued as the mill and contents slowly cool. During the first hour of this slow cooling process, 100 parts of water are added in small portions.

After the mass in the mill has cooled sufficiently to break to a fine cheese-like paste, it is milled for another 30 minutes, during which time another 100 parts of water are added. The mass is then cooled to room temperature by passing cold water through the block and rotors of the mill. The slurry is dumped from the mill and reduced slowly by stirring in the remaining 200 parts of water, after which 95 parts of chromic acid are added slowly with constant agitation to insure uniform dispersion.

The chromic acid constitutes about 30% by weight, based on the combined polymer and chromic acid content, and about 11.5% of the total composition which has a solids concentration of approximately 42%.

The composition is then applied to a metal base and heated to at least 248° F. for about 15 minutes to form a continuous film of the coating and cause it to become firmly attached to the metal base.

*Example 2*

| | Parts |
|---|---|
| Chlorosulfonated ethylene polymer | 100 |
| Partial oleic ester of polyoxyalkene ether ("Tween 80") | 10 |
| Barytes | 125 |
| Colored pigment | 14 |
| Dipentamethylene thiuram tetrasulfide ("Tetrone A") | 8 |
| Magnesium oxide | 20 |
| Chromic acid | 43 |
| Water | 300 |

The chlorosulfonated ethylene polymer is prepared by the method described in U. S. Patent No. 2,212,786, and is placed in a Banbury Mill with steam passing through the jacket and rotors to keep the contents of the mill at approximately 212° F. and milled for about 5 minutes until the composition is thoroughly plastic; the oleic ester is added to the mill and mixed for 5 minutes at which time it will be thoroughly mixed into the hot plastic. All remaining ingredients, except the water and the chromic acid, are then added and the mixing continued until thoroughly dispersed, with cold water running through the jacket and rotors of the mill, in order to keep the temperature of the composition below 212° F. The water is then added slowly with continuous agitation in the mill.

At first the composition is of a very stiff consistency and as the water is increased it becomes the continuous phase and the plastic becomes the discontinuous phase suspended in the water. The slurry, or suspension, is discharged from the mill and the chromic acid is then added and thoroughly dispersed.

The chromic acid constitutes 30% by weight, based on the combined polymer and chromic acid content, and about 7% of the total composition which has a solids concentration of about 50%.

The coating composition is applied to a metal base and heated for 1 hour at 302° F. to form a continuous film, to effect curing or vulcanization of the coating composition, and to develop a firm bond of the coating to the metal base.

*Example 3*

| | Parts |
|---|---|
| Finely divided chlorofluoroethylene polymer | 50.0 |
| Sodium salt of the sulfuric acid ester of a mixture of long chain alcohols (predominantly lauryl alcohol) | 0.5 |
| Chromic acid | 41.0 |
| Water | 104.3 |

The 41 parts of chromic acid are added as a solution in 24 parts of water which is then thoroughly mixed with the remaining ingredients.

The chromic acid constitutes 45% by weight, based on the combined polymer and chromic acid content, and about 21% of the total composition, which has a solids concentration of approximately 47%.

The composition is strained and applied to bare, clean, lightly sanded aluminum and steel panels which are then baked at about 600° F. for 5 minutes, and results in a strong, adherent film.

In addition to the procedures outlined above, it is also possible to prepare suitable and useful coating compositions for the purposes of this invention by first preparing a solution of the chlorinated ethylene polymer in an organic solvent and adding water, together with suitable wetting agent, to the organic solution with agitation, thus forming a suspension of the polymer solution in water. The organic solvent is then removed by evaporation. Suitable wetting agents for this purpose are duodecane sulfonate or the wetting agents used in the above examples.

It is sometimes desirable to carry out the evaporation of the organic solvent at reduced pressure while stirring. The other ingredients, including the chromic acid, may be introduced into this suspension of the chlorinated ethylene polymer without further treatment.

These compositions may be applied by any suitable means to any suitable substrate, but in all cases, it is necessary to heat the coated substrate to form a continuous film and effect a firm bond between the coating and the substrate.

Any wetting or dispersing agent may be used in the compositions of this invention, provided it is stable in the presence of the other ingredients. The wetting agent concentrations shown are not critical, but controlled amounts are helpful in adjusting the final compositions to yield optimum stability, application properties, appearance, and performance.

The solids concentration (total polymer and chromic acid) of the final composition and the polymer concentration may vary over a wide range.

The amount of chromic acid used may vary over a wide range of proportions. In the examples, there are illustrated compositions in which the chromic acid constitutes from 30% to 45% of the combined polymer and chromic acid content. It is understood, however, that the chromic acid may vary from 1% to 90% of the combined polymer and chromic acid content, and it is preferred to use from 10% to 70%.

If desired, modifying agents, such as pigments, varnishes, organic solvents, and other film-forming materials, may be added (provided they are compatible with and stable in the presence of the other ingredients), and they are useful in imparting color, or enhancing hiding power, or giving other properties to the compositions of this invention.

When applying the compositions of this invention to ferrous metal substrates, it is often advantageous to incorporate zinc phosphate dissolved in a solution of chromic acid.

When a composition of this invention has been applied and baked as described, the resulting film adheres tenaciously to the substrate to a degree not previously possible with coating compositions containing chlorinated polymers of ethylene.

Furthermore, the adhesion is comparable to that of conventional synthetic organic enamels of the type commonly used on automobile bodies, refrigerator cabinets, and furniture.

The compositions of this invention are useful to improve adhesion in all cases where liquid coating compositions containing chlorinated polymers of ethylene are employed on relatively nonporous substrates and permit the use of such polymers in a manner similar to conventional liquid coating compositions. These uses include coating glass, ceramics, and metals (foil sheets, wires and cast or formed shapes). These compositions are also useful in impregnating glass fibers or glass cloth and in cementing them to substrates such as metal foil.

It is apparent that many widely different embodiments of this invention may be made without departing from the spirit and scope thereof; and, therefore, it is not intended to be limited except as indicated in the appended claims.

I claim:

1. A coating composition comprising 1–90% of chromic acid and 10–99% of a chlorinated ethylene homopolymer based on the combined chromic acid and homopolymer content.

2. The coating composition of claim 1 in which the homopolymer is a chlorosulfonated ethylene polymer.

3. The coating composition of claim 1 in which the homopolymer is a monochlorotrifluoroethylene polymer.

4. The coating composition of claim 1 in which the homopolymer is polychloroethylene.

5. A coating composition comprising chromic acid and an aqueous dispersion of a chlorinated ethylene homopolymer, the chromic acid constituting 1–90% of the combined chromic acid and homopolymer content.

6. The coating composition of claim 5 in which the chromic acid constitutes 10–70% of the combined homopolymer and chromic acid content.

7. The coating composition of claim 5 in which the solids concentration of the total composition is about 50%.

8. A coating composition comprising chromic acid, zinc phosphate, and an aqueous dispersion of a chlorinated ethylene homopolymer, the chromic acid constituting 1–90% of the combined chromic acid and homopolymer content.

HARRY J. HAON.

REFERENCES CITED

The following references are of record in the file of this patent:

UNITED STATES PATENTS

| Number | Name | Date |
|---|---|---|
| 2,385,800 | Douty et al. | Oct. 2, 1945 |
| 2,483,835 | Manzer | Oct. 4, 1949 |

Certificate of Correction

Patent No. 2,562,119                                              July 24, 1951

HARRY J. HAON

It is hereby certified that error appears in the printed specification of the above numbered patent requiring correction as follows:

Column 3, line 55, for "chlorofluoroethylene" read *chlorotrifluoroethylene*;

and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*